United States Patent [19]

Schaich

[11] Patent Number: 4,815,422

[45] Date of Patent: Mar. 28, 1989

[54] FOUR STROKE PISTON ENGINE

[76] Inventor: Josef Schaich, Oeschle 20, D-7906 Blaustein-Markbronn, Fed. Rep. of Germany

[21] Appl. No.: 160,218

[22] Filed: Feb. 24, 1988

Related U.S. Application Data

[60] Continuation-in-part of Ser. No. 9,533, Feb. 2, 1987, abandoned, which is a continuation of Ser. No. 768,559, Aug. 22, 1985, Pat. No. 4,640,237, which is a continuation-in-part of Ser. No. 602,973, Apr. 23, 1984, abandoned, which is a division of Ser. No. 302,993, Sep. 17, 1981, Pat. No. 4,450,795, which is a continuation-in-part of Ser. No. 957,661, Nov. 3, 1978, abandoned, which is a continuation-in-part of Ser. No. 854,904, Nov. 25, 1977, abandoned, which is a continuation of Ser. No. 643,165, Dec. 22, 1975, abandoned.

[30] Foreign Application Priority Data

Dec. 24, 1974 [DE] Fed. Rep. of Germany ....... 2461444
Jun. 30, 1975 [DE] Fed. Rep. of Germany ....... 2529074

[51] Int. Cl.⁴ .............................................. F01L 1/28
[52] U.S. Cl. .................................. 123/79 C; 123/297; 123/279
[58] Field of Search ............... 123/79 C, 276, 295, 123/296, 297, 279, 306, 309, 507, 508

[56] References Cited

U.S. PATENT DOCUMENTS

| | | | |
|---|---|---|---|
| 987,801 | 3/1911 | Greater | 123/79 C |
| 1,386,832 | 8/1921 | Bailly | 123/507 |
| 1,425,614 | 9/1923 | Straussler | 123/79 |
| 1,544,906 | 7/1925 | Hesselman | 123/79 C |
| 1,644,777 | 10/1925 | Gehres | 123/79 C |
| 1,657,108 | 7/1927 | Clemens | 123/79 C |
| 1,786,946 | 12/1930 | Hofmann | 123/796 |
| 1,828,792 | 10/1931 | Tverbakk . | |
| 1,925,614 | 9/1933 | Straussler | 123/296 |
| 2,044,522 | 9/1936 | Wurtele | 123/296 |
| 2,269,104 | 1/1942 | Hedlund | 123/32 |
| 2,331,912 | 10/1943 | Holthouse | 123/297 |
| 2,462,854 | 3/1949 | Gates | 123/507 |
| 2,466,321 | 4/1949 | Mackenzie | 123/32 |
| 2,469,448 | 5/1949 | Barber | 123/32 |
| 2,471,509 | 5/1949 | Anderson | 60/13 |
| 2,840,059 | 6/1958 | Buchi | 123/32 |
| 2,935,055 | 5/1960 | Neir | 123/41.41 |
| 3,003,483 | 10/1961 | Buchi | 123/32 |
| 3,015,323 | 1/1962 | Buchi | 123/79 |
| 3,094,974 | 2/1963 | Barber | 123/32 |
| 3,154,059 | 10/1964 | Witshy et al. | 123/32 |
| 3,195,520 | 7/1965 | Simko | 123/32 |
| 3,318,292 | 5/1967 | Hideg | 123/32 |
| 3,353,521 | 3/1968 | Ley | 123/32 |
| 3,504,681 | 4/1970 | Winkler | 123/32 |
| 3,641,986 | 2/1972 | Fricker et al. | 123/32 |
| 3,924,598 | 12/1975 | Davis | 123/32 |
| 4,086,878 | 5/1978 | Eisele et al. | 123/1 |
| 4,095,580 | 6/1978 | Murray | 123/796 |
| 4,450,795 | 5/1984 | Schiach | 123/79 |
| 4,450,796 | 5/1984 | Schaich | 123/79 C |
| 4,539,950 | 9/1985 | Schaich | 123/79 C |
| 4,640,237 | 2/1987 | Schaich | 123/79 |
| 4,649,872 | 3/1987 | Solheim | 123/79 |

FOREIGN PATENT DOCUMENTS 2529074 6/1975 Fed. Rep. of Germany .... 123/79 C
22950 of 1906 United Kingdom ............. 123/79 C Primary Examiner—Raymond A. Nelli
Attorney, Agent, or Firm—Jeffers, Hoffman & Niewyk

[57] ABSTRACT

A four-stroke piston engine in which air is drawn into a cylinder while rotary motion about the cylinder axis is imparted to the air. Fuel may be blown/injected into the air during its rotation in the cylinder while the fuel supply is located on the axis of the cylinder and supplies at least one jet of fuel initially directed radially outwardly and which jet of fuel in cooperation with the rotating air forms at least one helical stream of mixture within the cylinder, preferably during the compression stroke, which is transformed into a coherent mixture zone enclosed by a ring of air upon completion of compression. The piston may have a recess so that when the piston approaches top dead center an enriched zone is formed in the lower region of the compression space which can be ignited by electrodes disposed in said lower region of the compression space. The stratified charge in the cylinder of the stratified-charge engine comprises a mixture zone of comparatively small volume and a mixture zone of comparatively large volume which may have different fuel concentrations plus a thermally insulating zone of air.

4 Claims, 15 Drawing Sheets

FOUR STROKE PISTON ENGINE

CROSS-REFERENCE TO RELATED APPLICATIONS

This is a continuation-in-part of application Ser. No. 009,533, filed Feb. 2, 1987, now abandoned, which is a continuation of application Ser. No. 768,559, filed Aug. 22, 1985, now U.S. Pat. No. 4,640,237, which is a continuation-in-part of application Ser. No. 602,973, filed Apr. 23, 1984, now abandoned, which is a division of application Ser. No. 302,993, filed Sept. 17, 1981, now U.S. Pat. No. 4,450,795, which is a continuation-in-part of application Ser. No. 957,661, filed Nov. 3, 1978, now abandoned, which is a continuation-in-part of application Ser. No. 854,904, filed Nov. 25, 1977, now abandoned, which is a continuation of application Ser. No. 643,165, filed Dec. 22, 1975, now abandoned.

BACKGROUND OF THE INVENTION

The present invention relates to reciprocating piston engines and, in particular, to an engine of this nature in which a piston reciprocates in a cylinder within which zones having differences in fuel enrichment are established.

The cylinder, furthermore, comprises a head having means for establishing directionally oriented gas flow into the cylinder.

It is known to subdivide an engine cylinder to establish chambers to which fuels for different enrichment of the air are supplied. In such engines, the richer mixture is ignited and the mixture of lesser richness is ignited from the richer mixture. Engines of this nature are stable under various load conditions, including constant load, but have a high rate of fuel consumption and are characterized by high direct and indirect heat losses (to the walls and exhaust gases respectively).

It is also known to construct engines in which the cylinder space is not subdivided but which include devices for generating regions of differing fuel-air mixtures within the cylinder. Such engines have a better fuel economy than the ones referred to above when the motor is under less than full load and, like the first mentioned engine, have a low quantity of noxious emissions in the exhaust gases. This last mentioned type of engine is, however, unstable in operation. In order to utilize the thermodynamic advantages resulting from the combustion of lean mixtures, stratified-charge engines without secondary combustion chambers have ben designed which distribute the basic mixture over the entire available space. In such engines, air flows into the cylinder through valves disposed in an off-center position. The open inlet valve projecting into the compression space in an off-center position, the off-center gas inflow and partial shrouding of the valve gap produce a very strong gas turbulence in the cylinder. If fuel is then injected into the piston-swept or compression space at the start of the compression stroke, a fuel-air mixture distributed over the the entire space is produced in the cylinder as a result of the gas turbulence. It is true that certain zones of the air are enriched with fuel if fuel is injected just before ignition, but this is not a mixture formation which can be used for favorable combustion. The very slow flame propagation in very lean mixtures has considerable drawbacks with respect to thermal efficiency.

However, if the mixture is concentrated primarily in the inner region of the combustion space, then the resulting flame travels are very short so that even lean mixtures can be burned with sufficient speed. If a ring of air envelopes the burning gases, such a ring has an isolating effect so that thermodynamically and in terms of heat losses the system (air-enveloped mixture zone plus air-enveloped burning gases) behaves similar to a system in which the same amount of fuel is distributed over the entire available space and the entire air and in which the lean mixture is burned with sufficient speed.

If the intake air is not throttled, then a large amount of gas is contained in the comparatively small-volume air-enveloped mixture zone. In the upper load range, the amount of gas contained in the mixture zone is increased by pressure charging so that the power output is similar to that of a comparable Otto-cycle engine.

The object of the present invention is the construction of a reciprocating piston engine in such a manner that mixing zones are established in the cylinder which show different ratios of fuel to air thereby obtaining the advantages of the type of engine in which a richer fuel-air mixture is ignited which, in turn, ignites a lower ratio fuel-air mixture, thus improving thermal efficiency and reducing the emission of pollutants.

One object of the present invention is the provision of a reciprocating piston engine of the nature referred to which is stable in operation under all load conditions.

A further object of the present invention is the formation of at least one helical stream of fuel-air mixture which is then transformed to a zone of mixture enclosed by a ring and/or cylinder of pure air to increase thermal efficiency. A further object of the invention is the reduction in length of flame travel.

BRIEF SUMMARY OF THE INVENTION

During operation of the engine, unthrottled air enters the cylinder of the engine, which may be a naturally aspirated or a pressure-charged engine. The air is caused to rotate around the longitudinal axis of the cylinder, preferably by means of guide vanes and/or an appropriately shaped inlet channel arranged in the region of the inlet valve. The inlet valve is preferably located substantially coaxially on the longitudinal axis of the cylinder and the inlet channel, the guide vanes and the inlet valve head are shaped appropriately so that the air will enter the cylinder substantially without turbulence and helically rotating and will continue rotating in the cylinder substantially without turbulence and peculiarities during the intake stroke, compression stroke, expansion stroke and exhaust stroke.

To assure that the air in the piston-swept and compression spaces rotates substantially without turbulence, it may be advantageous to use a substantially symmetrical design for the piston-swept and compression spaces. This symmetry can be achieved by arranging the inlet and outlet devices substantially coaxially with the longitudinal axis of the cylinder and by arranging the ignition and nozzle devices in the region of the longitudinal axis of the cylinder.

When the cylinder becomes filled the flow of air in the cylinder is being superposed with the rotating flow of air getting in. The helical motion of the air is directed downwardly. The secondary motion of the gas flow is reversed from downward to upward with the beginning of the compression stroke while the direction of rotation (primary motion) remains unchanged.

Thus, helically rotating air from within the piston-swept space enters the compression space during the compression stroke. For the proper formation of the desired mixture configuration, it is important that the rotating air flows substantially without turbulence and peculiarities. During the intake stroke, the hot residual gas is forced into the inner region of the cylinder by the inflowing rotating cold air. This gasdynamic process contributes substantially to the formation of a gas flow around the longitudinal axis of the cylinder which is substantially free from turbulence.

The motion of the gases in the cylinder is a spatial motion composed of a rotational motion (primary motion) and a translational motion (secondary motion). The pitch of the helically rotating air substantially depends on the pitch angle of the guide vanes and/or the shape of the inlet channel.

The mixture formation in the piston-swept and compression spaces occurs during operation of the engine by the hole of at least one first nozzle inclined against a plane extending parallel to the longitudinal axis of the cylinder and located within the region of the longitudinal cylinder axis and in the lower region of the compression space and supplying a jet of fuel extending initially substantially outward toward the cylinder wall, i.e. substantially transversely to the axis of rotation of the helically rotating air, substantially during the compression stroke. Due to the gas rotation in the cylinder, the jet terminating somewhere between the nozzle and the cylinder wall is deflected by the air when viewed axially of the cylinder. The primary and secondary motions of the air, and the motion of the air relative to the vapor jet occurring during mixture formation, create a helical mixture zone enveloped by air which extends toward the inlet means and forms a coherent, substantially rotary-symmetrical zone of rotating, combustible basic mixture enveloped by air upon completion of compression, the diameter of which is smaller than that of the cylinder if the jet of fuel blown into the piston-swept and/or compression space has an appropriate length. In other words, the helically rotating air flowing from the piston-swept space into the compression space during the compression stroke sweeps past the fuel jet, carrying along fuel from the jet with which it initially forms a helical stream of mixture and then a zone of combustible, rotating fuel-air mixture enveloped by air. The initial value and subsequent variation of the pressure differences between the fuel delivery device and the cylinder produces a momentum of the fuel jet which is reduced to zero between the nozzle and the cylinder wall by the helically rotating air so that the jet terminates before it reaches the cylinder wall. The fuel may be blown in as a vapor or injected as a liquid. If the fuel is injected as a liquid, the droplets will evaporate before they reach the cylinder wall due to relative movement and heat transfer between air and fuel. In order to assure that disintegration and evaporation of the fuel jet take place in a manner conductive to the formation of a mixture zone with a comparatively well defined contour, the parameters relating to the fuel and the air respectively must be matched to each other.

For even distribution of the fuel transversely to the axis of the cylinder out to a limit defined by a circle whose diameter is smaller than that of the cylinder, and for the formation of a transition zone of small volume between the basic mixture and the air enveloping the basix mixture, the jet of fuel has a particular configuration. This configuration is due, among other things, to the depth to which the fuel penetrates into the helically rotating air which, in turn, depends on the momentum of the fuel and the aerodynamic forces acting on the fuel jet.

The configuration of the jet of fuel and the distribution of fuel transversely to the longitudinal axis of the cylinder can be governed by the blow-in pressures of the fuel, the amount of fuel, the two blow-in angles relative to the axis perpendicular to the longitudinal cylinder axis, the cross-section of the first nozzle, the nozzle cone, the length of the nozzle, temperature and nature of fuel and duration of blow-in over crank angle degrees and by appropriate selection and setting of these parameters to suit the parameters pertaining to the air itself, such as the primary and secondary motions of the air, especially in the region of the fuel jet(s), the density and temperature, pressure and speed profile in the rotating air, in order to obtain a predetermined mean air ratio in the basic mixture and to maintain the air ratio transversely to the longitudinal cylinder axis substantially constant. The abovementioned parameters of the rotating air in the cylinder are influenced by the engine speed, the stroke/bore ratio, the pitch angle of the vanes and the cross-section and configuration of the intake means, among other things.

Together, the parameters pertaining to the fuel and the air assure a relatively uniform fuel distribution up to a certain radial limit and outwardly therefrom there is a rather narrow transition zone separating the basic mixture from the air.

To obtain the desired basic mixture with a predetermined volume enclosed by a ring of pure air and a predetermined air ratio within the zone of the basic mixture prior to combustion, some of the aforementioned parameters are controlled with respect to time and during one single cycle of fuel blow-in. In a preferred embodiment, this control occurs sustantially between the end of the intake stroke and the point of ignition of the mixture in the cylinder.

During compression of the gases and fuel vapors in the cylinder, the parameters pertaining to the helically rotating air will change due to uneven piston movement and changes of the piston-swept volume.

The pressure and temperature of the air will unevenly increase during compression in the cylinder. The amount of helically rotating gas which flows from the piston-swept space into the compression space increases in the region in which it sweeps past the fuel jet. During compression, the secondary motion of the air is highest in the region of the piston and decreases toward the cylinder head. The primary and secondary motions of the air are similar to the motion of a potential swirl during compression.

To create in the piston-swept and compression spaces a substantially rotary-symmetrical zone of desired basic mixture with a comparatively clearly defined contour, which is substantially cylindrical in shape and, the fuel content of which is substantially constant also over the longitudinal cylinder axis and wherein the diameter of the zone is smaller than the cylinder diameter, fuel delivery curves of the fuel pump are required which correspond to the characteristic fuel demand curves of the engine. The shapes of the characteristic fuel demand curves are defined in particular by the parameters relating to the air flow, which vary during mixture formation, and by the load.

If the fuel is injected as a liquid, it is important that, in order to obtain a substantially cylindrical zone of rotating, combustible mixture which is enveloped by air and in which the fuel is substantially uniformly distributed, the pressure in the fuel delivery device and the fuel conducting means between the fuel delivery device and the nozzle during a single mixture forming process be adapted to the changes in pressure in the cylinder so that a fuel jet having a predetermined configuration is produced during a single mixture forming process if the cross-section of the nozzle is changed appropriately.

The amount of fuel required by the engine per crank angle degree during a single mixture forming process rises in proportion to the increase in density of the air sweeping past the fuel jet.

In order to keep the changes of the fuel jet configuration during a single mixture forming process within narrow limits and to obtain a zone of combustible, rotating and substantially cylindrical mixture enveloped by air with a predetermined volume in which the fuel is distributed substantially evenly along the longitudinal and transverse axes of the cylinder, the pressure in the fuel delivery device must rise more than the pressure in the cylinder if the fuel is blown in as a vapor.

In that case, the change in differential pressure between the fuel delivery device and the cylinder is important because the density of the fuel vapor in the fuel delivery device increases during the mixture forming process.

A change in differential pressure between the fuel delivery device and the cylinder which is substantially proportional to the pressure change in the cylinder during a single mixture forming process may be achieved by appropriately designing the shape of the pump cam and defining further parameters relating to the fuel delivery device (fuel pump), the nozzle and the fuel vapor.

If the amount of fuel blown into the cylinder per mixture forming process is changed, the mean differential pressure between the fuel delivery device and the cylinder rises or falls so that the amount of fuel blown in will be distributed over different amounts and volumes of air.

For example, the characteristic curves for a corresponding output of a reciprocating fuel pump may be achieved by means of an appropriately shaped three-dimensional cam which is shiftable in the axial direction with the cam configuration being different in respective axial positions thereof, so that the said pump delivery curves correspond to the characteristic fuel demand curves during each single mixture forming process and at any point of load.

If the fuel is blown into the cylinder as vapor, it is important that the volume of the line between the fuel pump and the nozzle including the volume of any other devices that may be disposed between the fuel pump and the nozzle and the mass of fuel contained therein, which varies during the mixture forming process, as well as its temperature be taken into account in adapting the fuel delivery curves of the fuel pump to the characteristic fuel demand curves of the engine.

During operation of the engine with the said basic mixture in the cylinder, said mixture extends from the center of the cylinder out to the periphery of a circle with a radius whose length is half that of the cylinder radius, for example.

Furthermore, adjustment of the fuel nozzle cross-section of the first nozzle to the parameters pertaining to the air and fuel throughout the operational range of the engine and also during each individual mixture forming process may be expedient for achieving the result referred to.

If the fuel is blown in as a vapor, the distribution of the fuel in proportion to the air can be influenced with respect to the air ratio and the volume of the fuel-air mixture by changing the nozzle cross-section and the pressure in the fuel delivery device as a function of the changing cylinder pressure.

If the fuel is injected as a liquid, changing the nozzle cross-section is important to obtain a predetermined volume of fuel-air mixture in which the fuel is distributed substantially evenly along the longitudinal and transverse axes of the cylinder.

A particularly advantageous embodiment of the invention is one wherein the amount of fuel required for a specific load is so distributed over the helically rotating air that a lean mixture is produced.

The output of the engine is controlled by varying the air ratio in the mixture zone on the one hand and the blow-in/injection depth of the fuel and, thus, the volume of the mixture zone enveloped by air on the other hand.

The change in the fuel nozzle cross-section of the first nozzle during mixture formation may be caused mechanically by adjustment of a needle disposed in the first nozzle. A three-dimensional cam is also employed for adjusting the nozzle needle and is also adjustable in the axial direction with different cam formations being provided at different axial regions along the cam. Connection of the cam to the nozzle needle is by means of mechanical elements provided on and in the nozzle carrier, an advantageous arrangement being one whereby the force applied to the nozzle needle is transmitted by a control needle acted upon by the cam. The cam outside the nozzle carrier is driven by means of suitable drive elements. A device transforms parameters such as engine speed and pump cam position into control signals which serve to adjust, by means of a suitable control device and mechanism, the cam for adjustment of the nozzle cross-section of the first nozzle provided in the compression space.

The adjustment of the nozzle cross-section for the formation of the basic mixture zone can thus be effected in conformity with the parameters related to the fuel and the helically rotating air.

Correction of the nozzle cross-section of the first nozzle may be effected by evaluating signals from a sensor placed in the cylinder head which senses the temperature in the cylinder in order to control the diameter of the basic mixture during operation of the engine and, in particular, during the non-stationary phases. Therefore, if the fuel is blown in as a vapor, fuels of different boiling curves may be used if the other parameters are appropriately adapted.

It may be expedient to close the first nozzle by means of the nozzle needle upon completion of the mixture forming process and to open it again at the beginning of the next mixture forming process. If the first nozzle is closed upon completion of the mixture forming process by means of a needle, for example, it must be opened comparatively slowly at the beginning of the next mixture forming process, taking into account the pressure of the fuel in the fuel line, which is initially comparatively high.

If the fuel is blown into the cylinder as vapor, it is unnecessary to change the nozzle cross-section of the first nozzle 10 during a single mixture forming process. The amount of fuel required for a single mixture forming process may also be distributed over a comparatively large or a comparatively small amount of helically rotating air, as may be desired, by changing the fuel vapor temperature in addition to changing the pressure in the fuel delivery device. If the parameters relating to the fuel are matched to the parameters relating to the air flow in such a manner that the differential pressures between the fuel delivery device and the cylinder change during a single mixture forming process and if the fuel vapor temperature is varied, if required, then, it is possible to achieve the desired result with respect to volume and air ratio of the mixture zone enveloped by air. The temperature change results in a change in pressure and momentum. To obtain an appropriate volume of fuel vapor for a favorable distribution of a predetermined fuel mass over a predetermined air mass, the temperature of the fuel vapor must be raised to a predetermined value depending on the parameters of the fuel. As the fuel mass to be introduced into the cylinder varies not only during each mixture forming process, but also in accordance with the load during operation of the engine, it is expedient to vary the temperature of the fuel vapor as well. The basic temperature of the fuel vapor depends on the boiling point of the fuel or, more specifically, its least volatile components and the pressure in the fuel vaporizing device upon completion of the compression stroke.

A number of possibilities exist in connection with the generation of the ignition mixture, said ignition mixture being formed by the first nozzle which forms the basic mixture or a second nozzle which is exclusively provided for forming the ignitable mixture.

One possibility in connection with the formation of an ignitable mixture is to generate the body of the mixture shortly before ignition takes place and directly in the region of the piston recess and of the nozzle carrier. This can be accomplished by taking into account the operational parameters pertaining to the fuel, the air and the basic mixture and causing at least one jet to impinge upon a spoon-like member, which jet flows out from the first nozzle, which forms the basic mixture, or from a second nozzle.

The spoon-like member is connected to the piston in the region of the piston recess and extends upwardly therefrom. Its height and position relative to a first or second nozzle carried by the nozzle carrier is arranged such as to trap the fuel last supplied by the respective nozzle and a few crank angle degrees prior to ignition. The gas flow pushes the cloud of enriched fuel-air mixture to the region of the electrodes. The electrodes are arranged in the region of the first or second nozzles, laterally above them on the circumference of the nozzle carrier taking into account further parameters.

A further possibility in respect of forming the ignitable mixture is to introduce an appropriate amount of fuel into the mixture flowing in the region of the piston crown and the nozzle carrier toward the end of the formation of the basic fuel-air mixture by means of the first or second nozzles and to ignite the resulting mixture. In this case, the configuration of the upper surface of the piston and of the piston recess, the time when the second fuel is blown in, the moment of ignition, the position of the first and/or second nozzles, the position of the electrodes, the rotational speed of the gases and the amounts of mixture and second fuel involved are of importance.

A still further possibility concerning the formation of an ignitable mixture consists in forming the ignitable mixture in a chamber. A substantially cylindrical or spherical recess in the upper end of the piston is largely closed by the nozzle and electrode carrier when the piston moves in the region of the upper dead center position and forms a chamber. A few crank angle degrees before ignition takes place, when the recess in the piston is largely closed by the nozzle carrier, liquid or gaseous fuel may be blown/injected into the chamber by means of the first or second nozzle. For this type of forming the ignitable mixture, the second nozzle is expediently disposed on the end face of the nozzle carrier, taking into account the relevant parameters. The burning gases which emerge from the slot between the nozzle carrier and the recess in the piston have high velocity, and can cause turbulence in the mixture in the cylinder in at least the inner region of the space above the piston, which accelerates combustion. In this embodiment of the means for forming the ignitable mixture, the electrodes are disposed on the circumference and/or the face of the nozzle and electrode carrier.

It may be expedient to blow in/inject the fuel forming the basic mixture as a first partial fuel stream and the fuel forming the ignitable mixture separately as a second partial fuel stream.

In one embodiment of the invention, the fuel forming the basic mixture is introduced as a liquid into a chamber disposed in the lower part of the nozzle and electrode carrier or between the nozzle and electrode carrier and the fuel pump and having small volume and a relatively large surface. The vapor formed in this chamber flows out from the first nozzle immediately following the chamber or disposed in spaced relation to said chamber. Heating and/or cooling the chamber in the nozzle and electrode carrier by means of a suitable fluid enables the temperature of the vaporized fuel to be adapted to the relevant parameters while the engine is running and a vapor to be formed when the engine is first started, a temperature sensor in the chamber and a further temperature sensor in the area of the nozzle, for example, and other suitable devices providing for control of the heating and cooling fluid. The fluid flowing through this chamber supplies heat when the engine is started and provides for heating and/or cooling of the chamber and thus a substantially constant temperature in the chamber once the engine has reached operating temperature.

That part of the fuel conducting means which connects the fuel delivery device to the chamber and in which the fuel exists in the liquid state must be cooled.

If the fuel is vaporized in a chamber located outside the nozzle and electrode carrier, the chamber, the fuel conducting means and the nozzle carrier must be heated in order to prevent condensation of the superheated vaporized fuel and to enable the necessary temperature of the fuel vapor to be maintained. This temperature is determined by a variety of factors including the least volatile fuel components and the gas pressure in the cylinder upon completion of compression. In order to obtain an even temperature distribution between the chamber and the first nozzle as well as in the chamber and in the first nozzle, it is necessary to heat the chamber, the fuel conducting means and the middle and upper parts of the nozzle and electrode carrier and to heat and/or cool that part of the nozzle and electrode carrier which projects into the compression space.

If liquid fuel is injected, the fuel conducting means must be cooled between the fuel delivery device and the first nozzle in order to avoid vapor lock.

It may be expedient to provide a relief valve between the fuel delivery device and the first nozzle, especially if the fuel is blown into the cylinder as vapor. This relief valve may be installed upstream of, downstream of or in the fuel vaporizing device (chamber).

When the first nozzle is closed by the nozzle needle and the relief valve opened, mechanically or electrically, on completion of the mixture forming process, substantially all of the fuel contained in the fuel conducting means flows out through the relief valve and is returned to the tank.

A simple open nozzle may be used instead of the first nozzle provided with a nozzle needle, especially if vaporized fuel is blown into the cylinder. In that case, the relief valve is briefly opened, mechanically or electrically, during the interval between the end of the mixture forming process and the start of combustion so that fuel-air mixture from the cylinder may flow into the fuel conducting means, flushing the fuel contained in the fuel conducting means out through the relief valve, with the result that only fuel-air mixture flows into the cylinder on completion of the combustion process and after the pressure has dropped in the cylinder. Formation of pollutants and coking at the nozzle are thus avoided.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
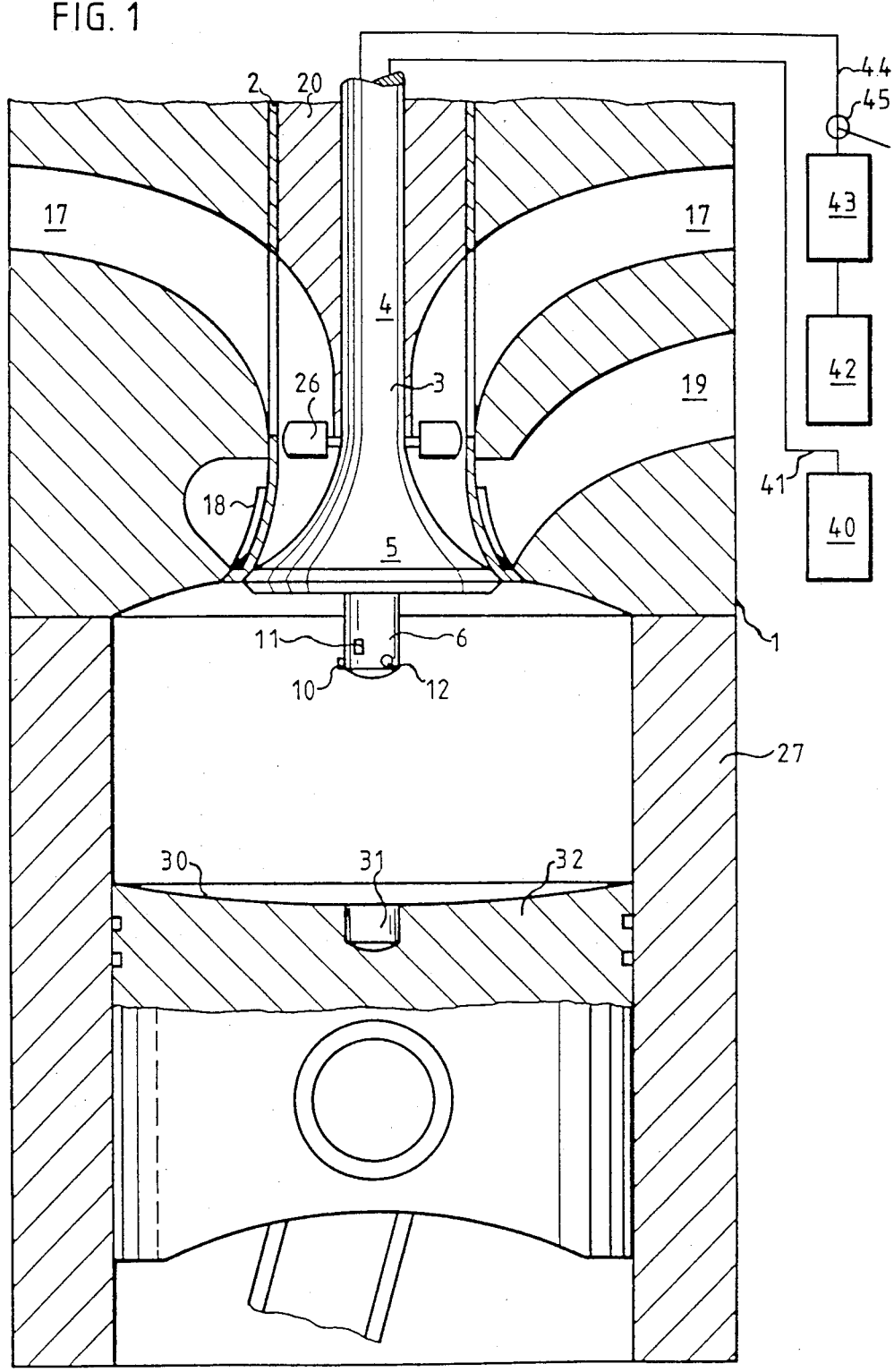
FIG. 1 is a sectional view of the cylinder and cylinder head with piston.

Inside the cylinder head 1 is provided an inlet valve 3 which is substantially coaxial with the piston and to the longitudinal axis of the cylinder to which it pertains. Another tubular valve 2 is provided which is coaxial with and surrounds valve 3 and acts as an outlet valve. Valve 3, which consists of a stem 4 and a valve head 5, is also hollow and carries a nozzle carrier 6 which is screwed in on the axis of the valve, and extends from the upper end of the stem 4 into the lower region of the compression space of the pertaining cylinder.

In addition to fuel line 44 inside the nozzle carrier 6 is located an electric lead 41 which conducts the igniting current to the electrodes 11 located on the nozzle carrier 6. The fuel line 44 through which the first pump 42 pumps fuel to the first nozzle 10 may incorporate a valve 45 through which fuel which builds up in the line 44 upon completion of the mixture forming process may flow back into the tank. The vaporizing device (chamber) is denoted as 43, the ignition current source as 40. The second pump and the second fuel line serving to form the ignitable mixture are not shown in the drawings. Inside the nozzle carrier 6 is located a control needle (not shown) with appropriate mechanical elements which establishes a connection between a three-dimensional cam and a nozzle needle in the nozzle 10. In order to enable the nozzle carrier 6 to be maintained at the temperature determined by the fuel, especially in the region of the compression space, the nozzle carrier is provided with bores for a heating and cooling fluid.

The first fuel nozzle 10 and the second fuel nozzle 12 are installed in the lower region of the nozzle carrier 6 and the first nozzle 10 is provided with a nozzle bore which is directed substantially toward the cylinder wall. The position of the electrodes 11 at the nozzle carrier 6 depends upon the region in which the ignition mixture is located at the very moment when the spark flashes over between the electrodes. The different partial fuels, the ignition current, the heating and cooling fluid, the current to a temperature sensor provided in the region of the first nozzle 10 and the mechanical work for the actuation of the control needle are supplied to the nozzle carrier 6 via flexible leads and mechanical elements.

The outer valve 2, which is movably supported inside the cylinder head 1 in two bores, controls the outlet channel 19 which annularly encircles the outlet valve 2. The outlet valve 2, when closed, comes to rest upon the cylinder head 1. The outlet channel 19 is found in the lower region of the cylinder head 1. The inner valve 3, which is movably supported in the insert 20 controls the inlet channel 17 which annularly encircles the outlet valve 2.

Between the inlet channel 17, which is found in the central region of the cylinder head 1, and the outlet channel 19, the cylinder head 1 is widened by boring so that the outer valve 2 can become movably supported. The outer valve 2, in the region of the compression space, serves also for the formation of the outlet and the inlet channels, and it is protected against the hot exhaust gases by a tubular apron 18.

The inlet channel 17 sourrounds outer valve 2, and openings in the stem of the outer valve 2 in the region of the inlet channel permit the gas required for the combustion to enter into the inside of tubular outer valve 2. By the action of the inner valve 3, the inlet channel 17 is closed and opened as the piston reciprocates in the cylinder. The lower end of outer valve 2 is constructed to serve as valve seat for the inner valve 3.

Fitted in the upper region of the inside of the valve 2, there is provided an insert 20. The insert is fitted into outer valve 2 such that this may shift axially. The insert is held stationary by supports (not shown) which are attached to the cylinder head and reach across the stem of the outer valve 2.

The insert 20 carries the guide vanes 26.

The cam shaft acts via rocker arms upon the valves 2, 3 or upon connection parts at the valve stems.

The upper contour of the compression space is defined by the substantially flat valve head 5 and the configuration of the cylinder head 1, which may be that of a circular arc, for example.

The cylinder is denoted by the numeral 27.

The piston 32 has a parabolical or circular depression 30 and incorporates a piston recess 31 in the region of the longitudinal axis. When piston 32 moves in the region of the upper dead center position, part of the nozzle carrier 6 will be in recess 31. The depression 30 carries at the rim of piston recess 31 a spoon-like element 35 which faces the second nozzle 12 or the first nozzle 10 and since inlet valve 3 is not allowed to rotate, this situation will occur on each piston stroke.

In the drawings, reference is also made to the voltage source 40 and the lead to the electrodes 41. The fuel pump for the formation of the basic mixture is denoted as 42, the fuel vaporizing device (chamber) as 43 and the fuel line as 44. The relief valve is denoted as 45. The fuel jet is denoted as 13. The helical stream of mixture enveloped by air is indicated at 14, the combustion gases are indicated at 15, and the ring of air is denoted as 16.

Figure 2:
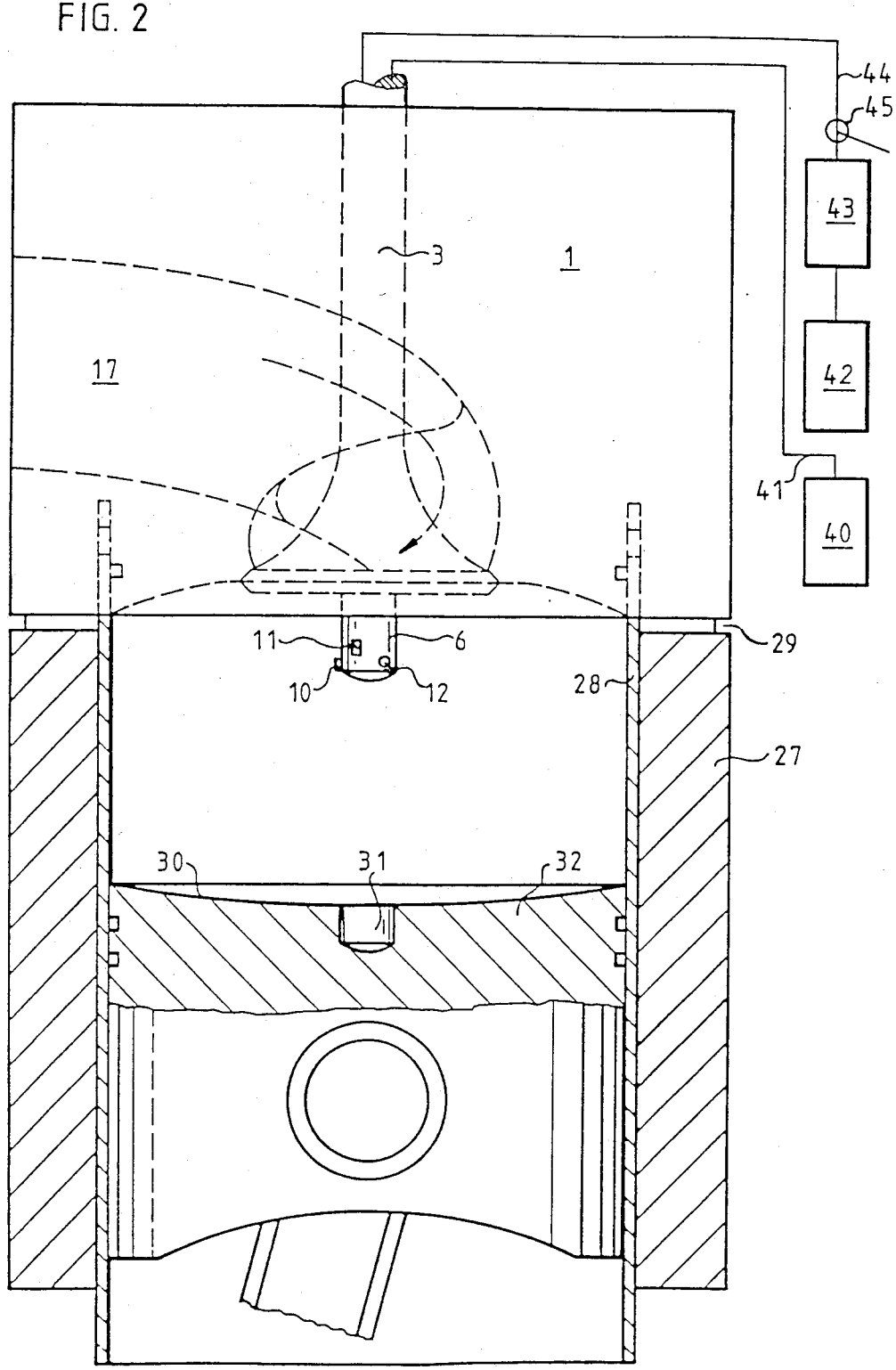
FIG. 2 is a sectional view as in FIG. 1 with detailed view of helical (spiral) channel.
Figure 3:
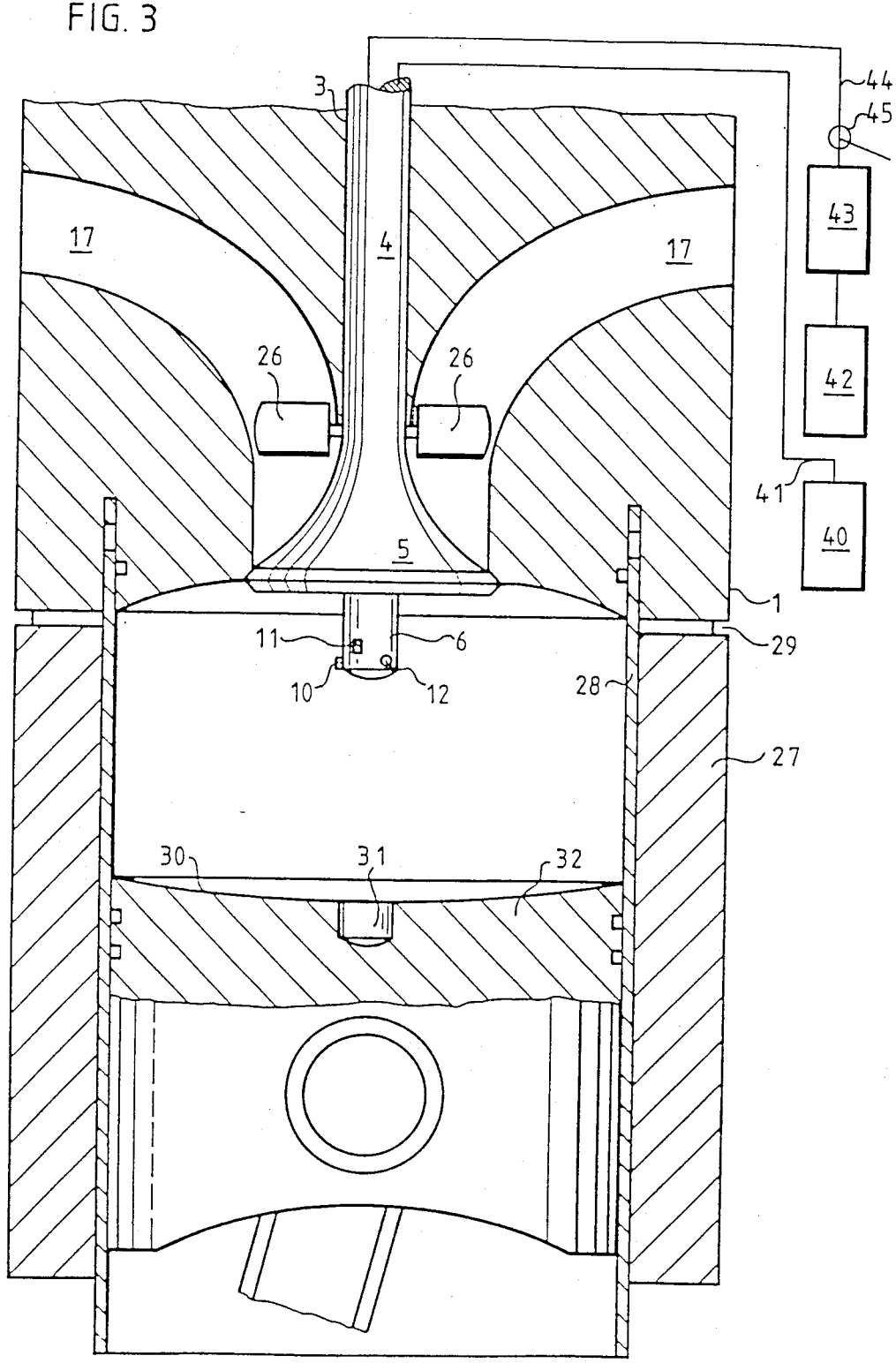
FIG. 3 is a sectional view through the cylinder head, sleeve valve and cylinder with piston.
Figure 4:
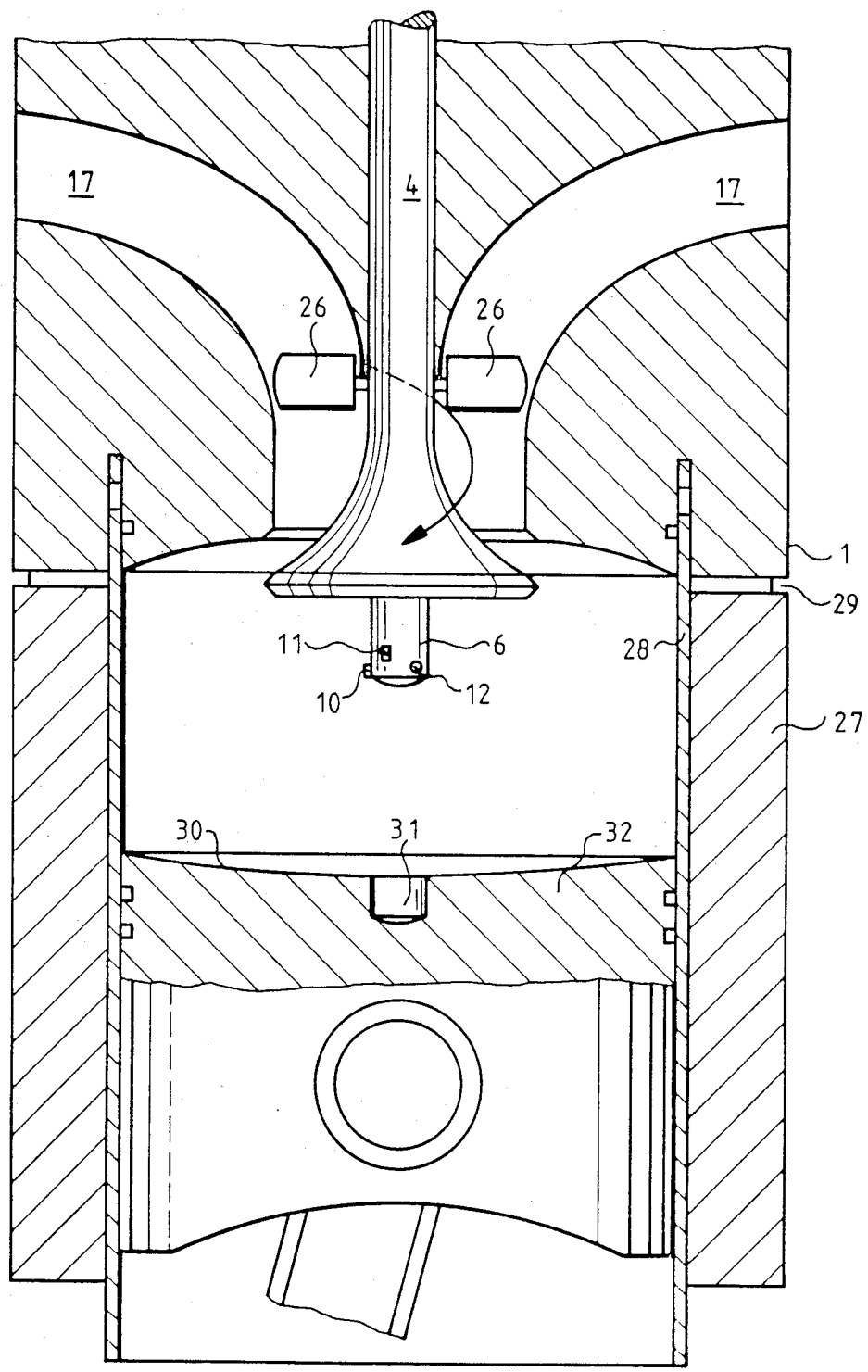
FIG. 4 is a sectional view as in FIG. 3 showing the helically rotating air flowing into the cylinder.
Figure 5:
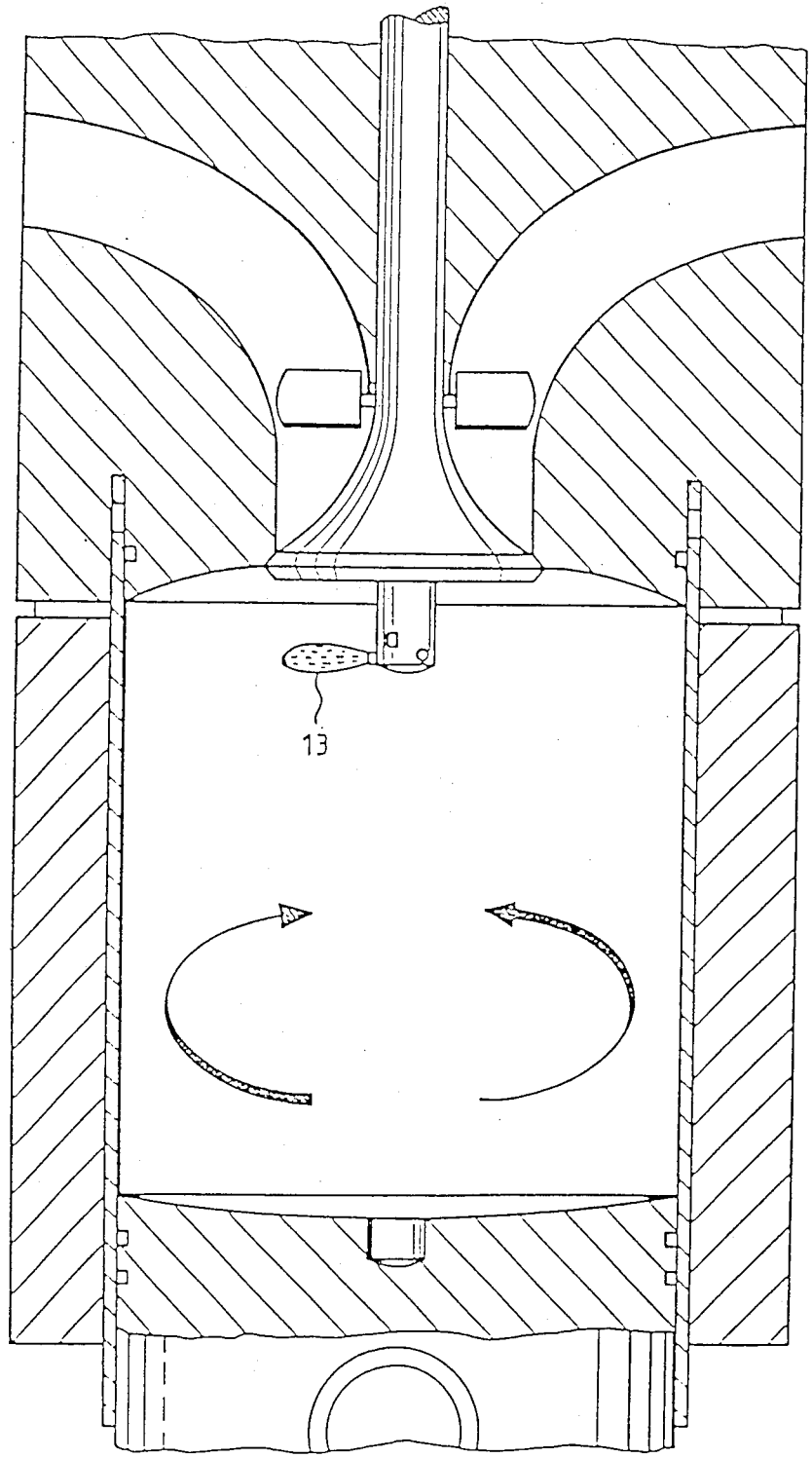
FIG. 5 is a sectional view of the cylinder head, sleeve valve and cylinder with piston and showing the start of the mixture forming process with the helically rotating air sweeping past the fuel jet.
Figure 5A:
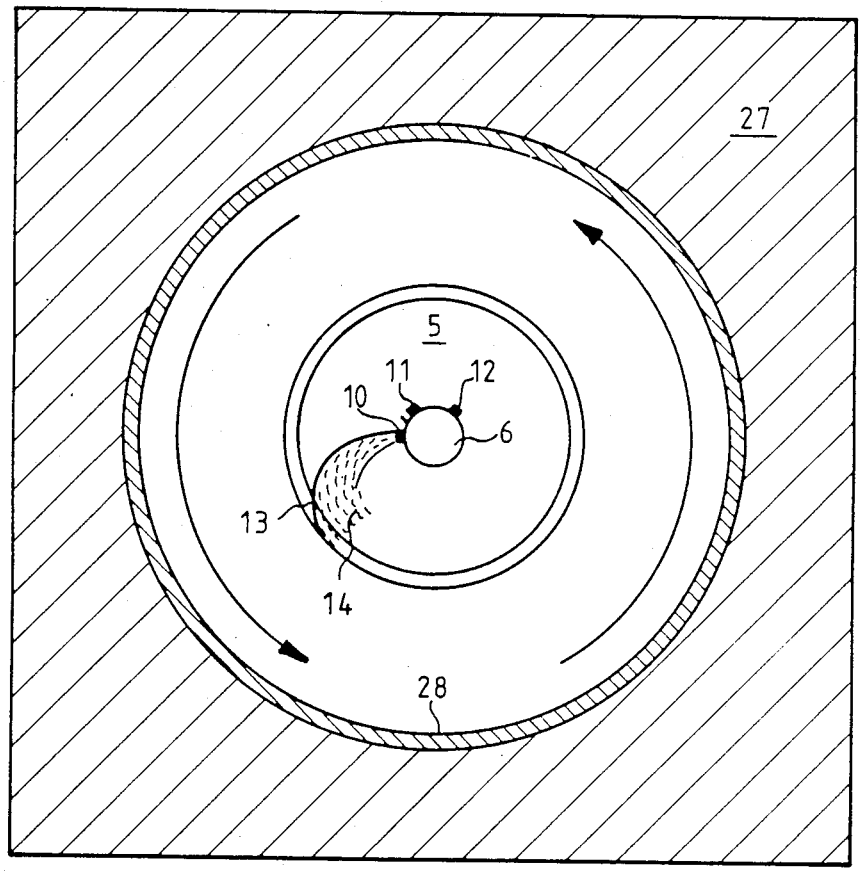
FIG. 5A is a view looking in the axial direction of the cylinder and showing the helically rotating air sweeping past the fuel jet.
Figure 6:
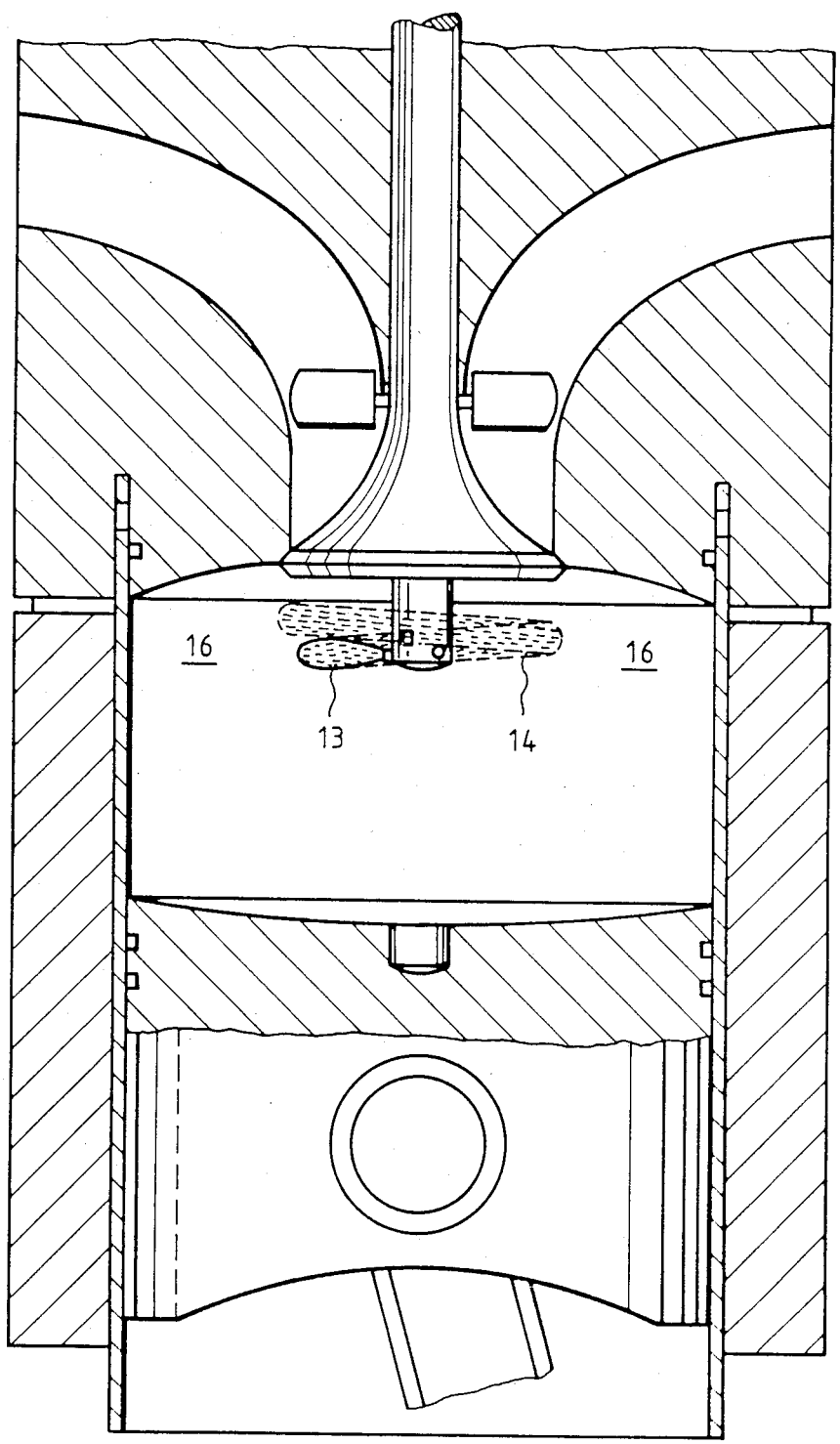
FIG. 6 is a sectional view as in FIG. 5 showing the fuel and the helically rotating air forming a stream of helically rotating mixture enveloped by air.
Figure 7:
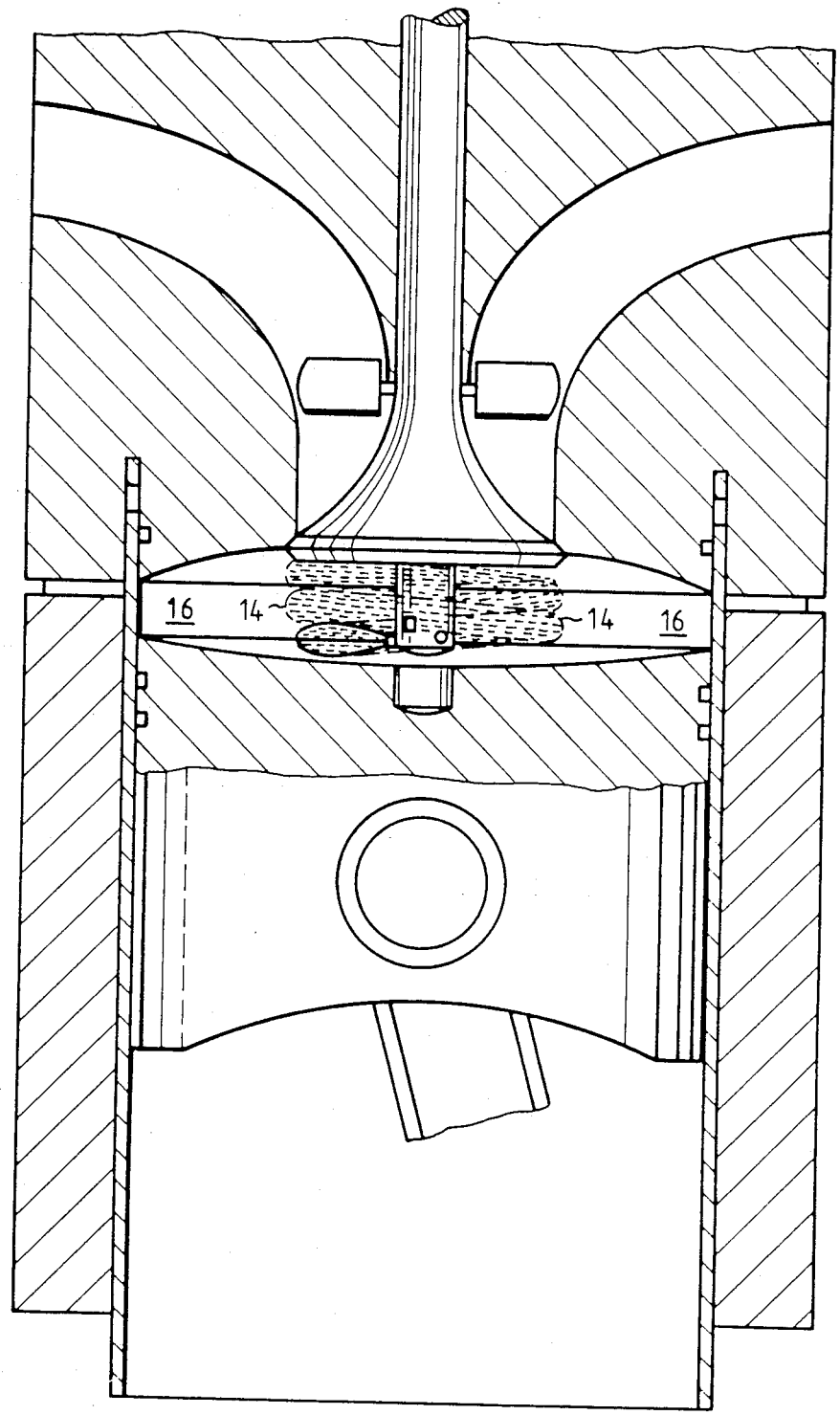
FIG. 7 is a progressive view of FIG. 6.
Figure 8:
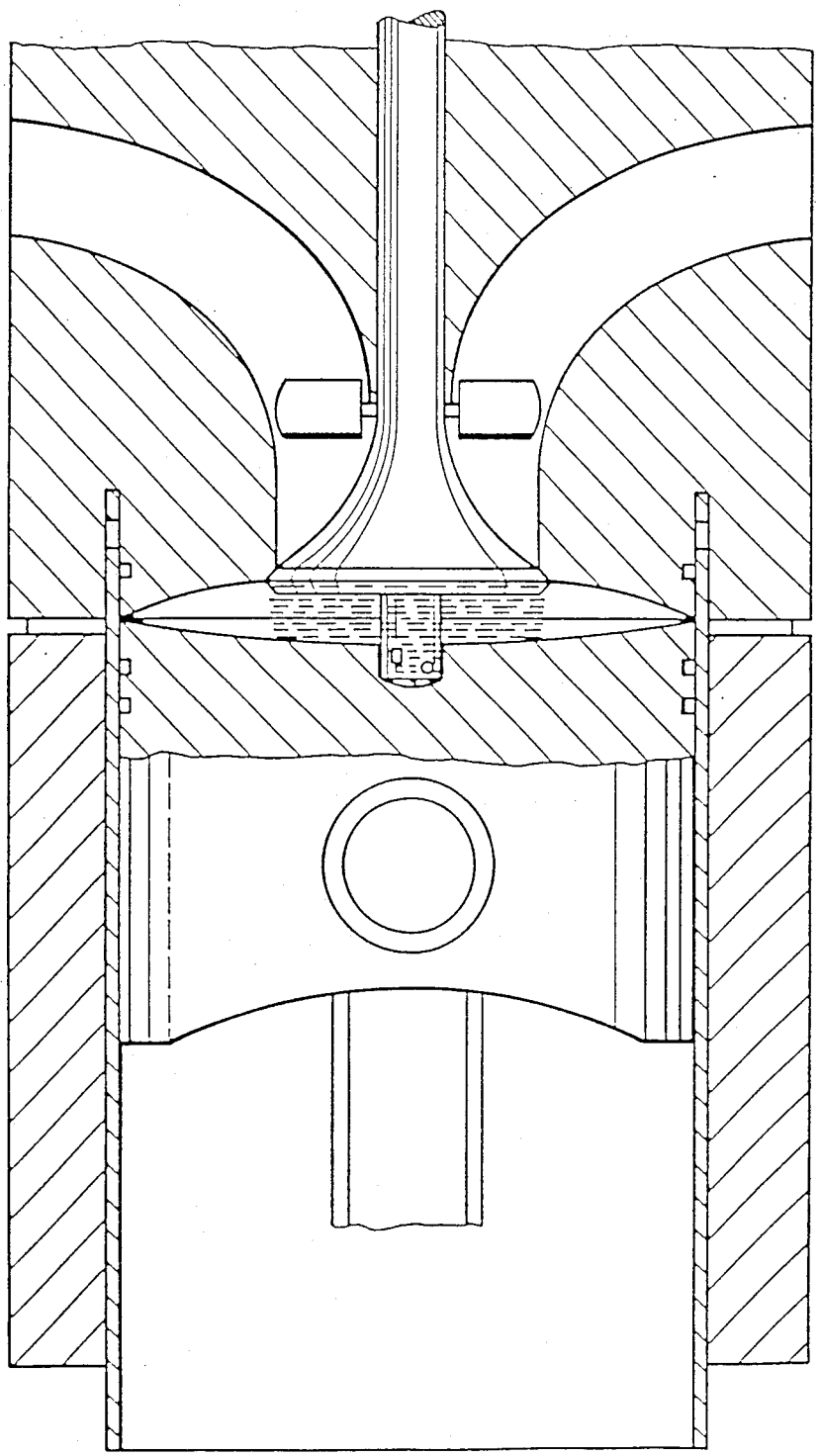
FIG. 8 is a progressive view of FIG. 7 showing the ignition stage of combustible mixture enveloped by air.
Figure 8A:
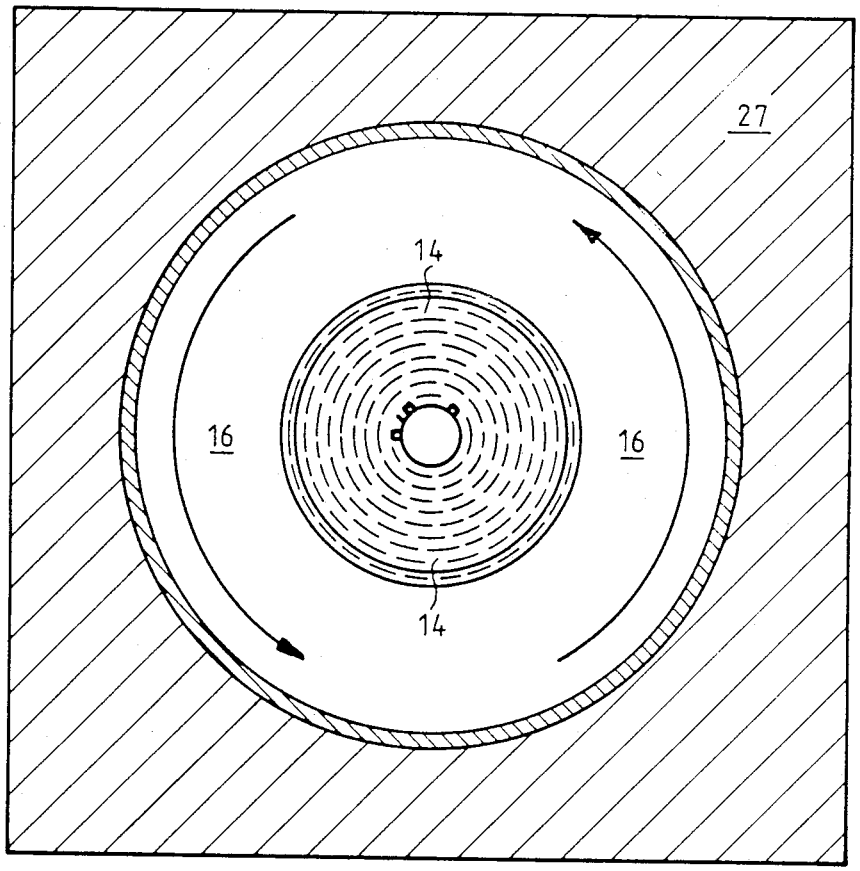
FIG. 8A is a view looking in the axial direction of the cylinder showing the ignition phase of the combustible mixture shown in FIG. 8.
Figure 9:
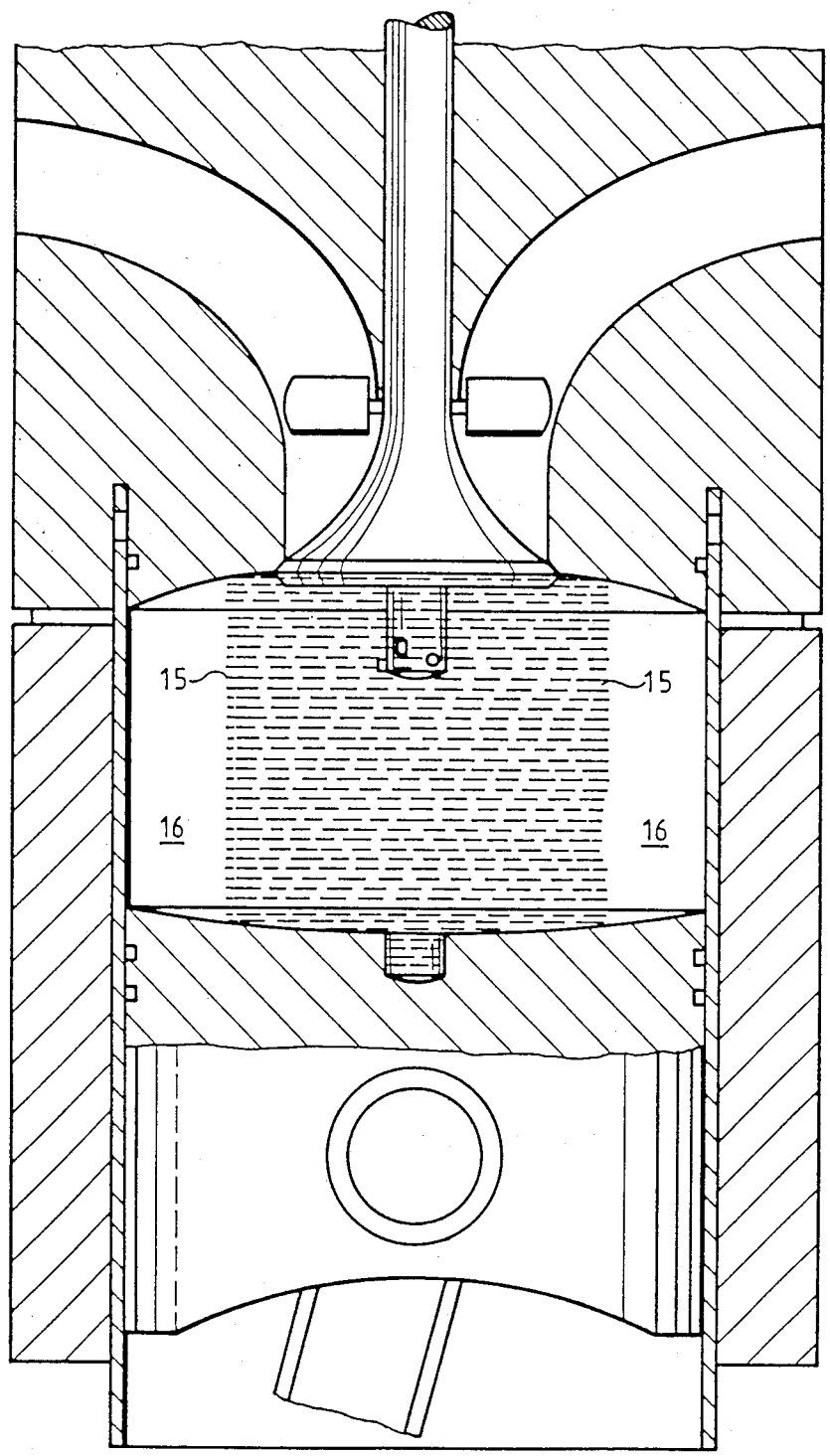
FIG. 9 is a sectional view as in FIG. 8 showing the rotating combustion gases enveloped by a rotating cylinder of air.
Figure 9A:
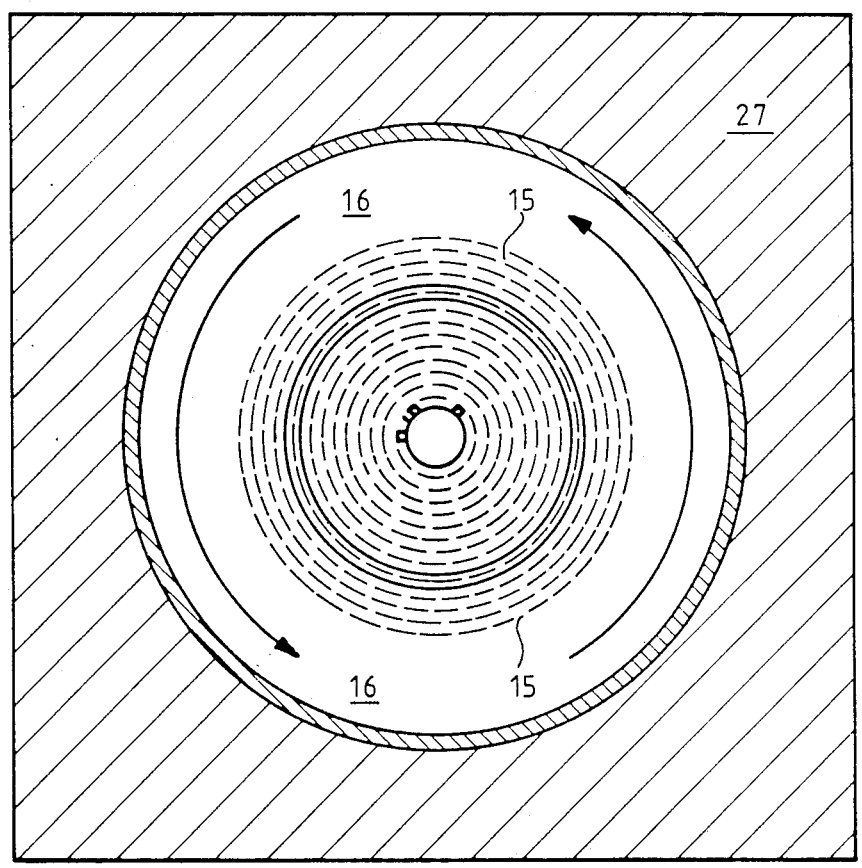
FIG. 9A is a view looking in the axial direction of the cylinder as in FIG. 9 and showing the rotating combustion gases which are enveloped by a rotating cylinder of air.
Figure 10:
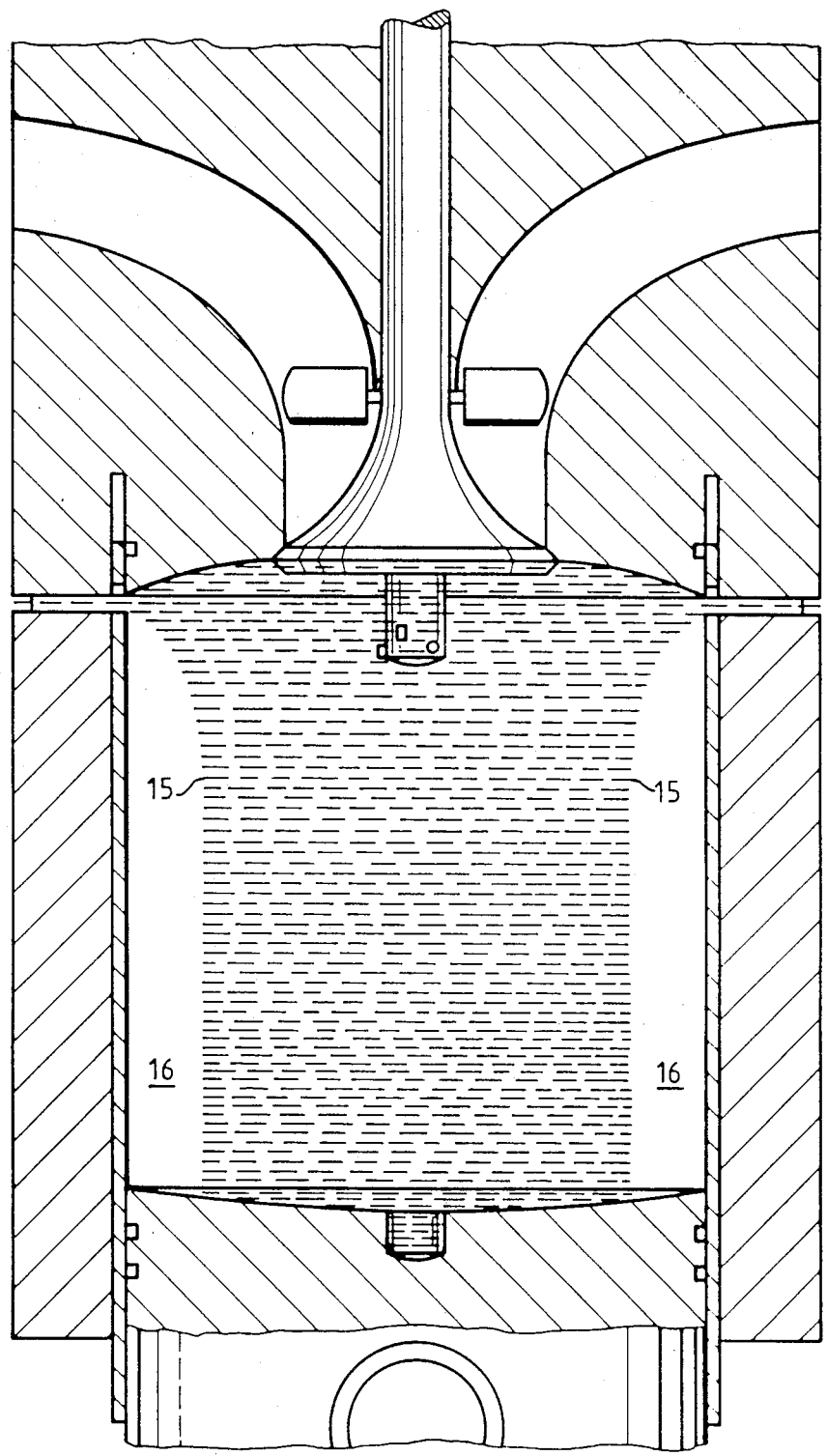
FIG. 10 is a sectional view as in FIG. 9 showing the combustion gases and the air exhausted through ports uncovered by the sleeve valve.
Figure 11:
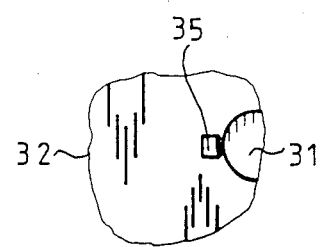
FIG. 11 is a fragmentary view of the piston with recess and spoon.
Figure 12:
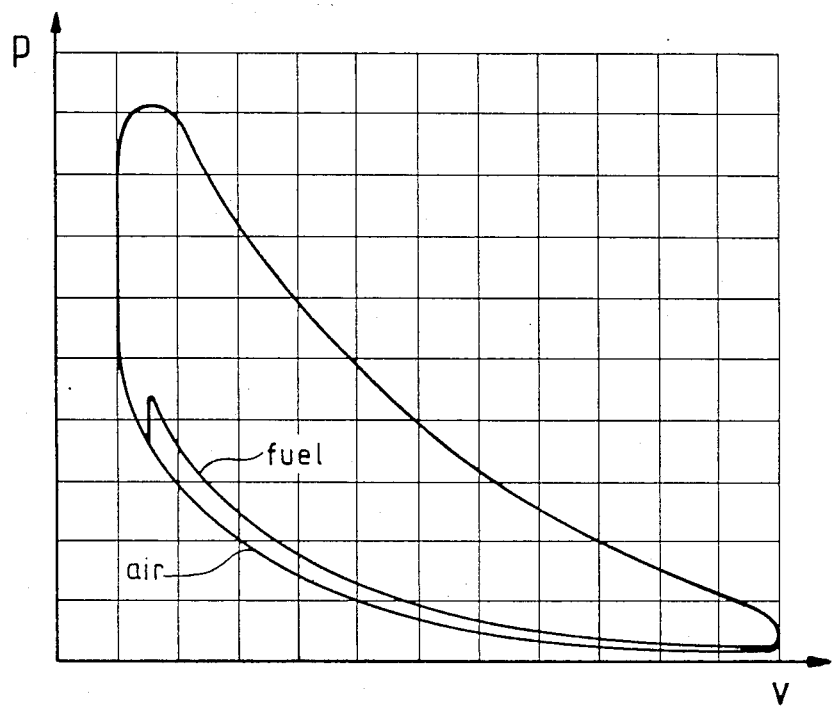
FIG. 12 shows a characteristic curve between the pressure and the piston travel in the cylinder and the fuel delivery device during a single mixture forming process.

Finally, the outlet valve may also take the form of a sleeve valve 28 disposed in the cylinder, while the inlet valve is disposed in the cylinder head as described, both valves being coaxially located on the longitudinal axis of the cylinder. The outlet channel related to the sleeve valve is denoted as 29 in FIGS. 2, 3 and 4. Microturbulence in the inflowing air may be reduced effectively if the inlet channel is funnel-shaped in the region of the cylinder head (FIG. 3). Furthermore, an appropriately designed inlet channel, such as a swirl (vortex) channel, may be used instead of the inlet channel provided with guide vanes (FIG. 2).

Numerous embodiments of the invention may be visualized.

Alternatively, the outlet opening of the nozzle 10 may be oriented so that the longitudinal axis of the nozzle 10 is not perpendicular to the longitudinal axis of the cylinder, but that it features a component relative to the longitudinal axis of the cylinder. Furthermore, the outlet opening of the nozzle 10 may be oriented so that it features a circumferential component relative to the nozzle carrier, i.e. that it is inclined against a plane extending parallel to the longitudinal axis of the cylinder.

The circumferential component, moreover may take such a form that the longitudinal axis of the nozzle 10 is a tangent to the circumference of the nozzle carrier. The fuel jet may initially follow the direction of rotation of the helically rotating air or move in the opposite direction.

According to a further embodiment, a plurality of first fuel nozzles 10, rather than one, are provided which may, for instance, be offset 180° to each other or 90° to each other and feature different bores, producing different jet configurations, in which case the openings of these nozzles may be arranged in such a manner that they will not only point in different outward directions, but also be inclined against planes extending parallel to the longitudinal axis of the cylinder.

According to yet another embodiment of the invention, a plurality of first nozzles 10 having identical or different bores and pointing in the same or different outward directions may be combined in one or a plurality of nozzle bodies.

The needles changing the cross-sections of the bores of the first nozzles 10 can be omitted if fuel injection starts at the nozzle with the smallest bore and is delayed at the nozzle with the greater bore by 40 crank angle degrees, for example. In that case, the fuel flow in the lines is controlled by means of additional valves.

It may be advantageous to use first nozzles 10 of a type which provides slender jet configurations. The most expedient number of nozzles 10 depends, among other things, on the configuration of the fuel jet and the angles at which the air hits the fuel jet. These angles, which change during the mixture forming process, are determined by the pitch angle of the guide vanes and/or the configuration of the inlet channel and the blow-in angles of the jet.

It may be advantageous to select the pitch angle of the guide vanes, the mean valve opening cross-section, and/or the design of the inlet channel so that the ratio of the engine speed to the mean speed of the rotating air is between 1:2 and 1:8.

If the ratio of engine speed to mean air speed is in the range of 1:2 to 1:8 and the fuel is blown/injected into the air by means of one or two nozzles 10, then the pitch of the helically flowing air in the region of the nozzle(s) 10 meets the requirements for the formation of a substantially dynamically balanced mixture zone enveloped by the air.

A mean pitch of the air rotating helically in the region of the first nozzles 10 and the fuel jet which is advantageous for the number of nozzles required and the distribution of fuel in the mixture is obtained if the ratio of engine speed to mean air speed is in the range from 1:2 to 1:8.

In any embodiment of the invention, it is important that the number of nozzles and the various parameters of the jets of blown-in or injected fuel be adapted to the helically rotating air and its parameters in such a manner that a coherent mixture zone is formed which is enclosed by a transition zone of small volume and a ring of air and in which the fuel is distributed so as to meet the requirements of a low-consumption and low-pollution engine. By adapting the various parameters related to the fuel to the variable parameters related to the helically rotating air, a favorable ratio of mixture volume to air volume meeting the requirements of a low-consumption and low-pollution engine can be achieved under all conditions of engine loading. In any embodiment of the invention it is also important that, taking into account the primary and secondary motions of the air and the residual gas, the outlet openings of the nozzles 10 be oriented in such a manner as to assure a favorable distribution of the fuel in the basic mixture and a high degree of utilization of the air flowing in the inner and intermediate regions of the piston-swept and compression spaces and to minimize enrichment of the residual gas with fuel.

Moreover, if one or a plurality of nozzles 10 are used, the single nozzle or one or two of a plurality of nozzles 10 or all nozzles 10 may be disposed in the region between the end of the nozzle carrier and the valve head so that the nozzle carrier projects beyond that part of the nozzle carrier which carries the nozzles.

The nozzle carrier may be shorter than shown in the drawings and the recess 31 in the piston may be correspondingly less deep or be omitted entirely. In that case, an advantageous arrangement is one in which the nozzle opening is again oriented outwardly and with a component directed downwardly toward the piston in order to thereby counteract the deflection of the fuel jet by the secondary motion of the air.

As already mentioned, the ignitable mixture is formed by the nozzle(s) 10 or the nozzle(s) 12 in the region of the nozzle carrier and the piston crown taking into account the parameters related to the second partial fuel stream and the air and/or mixture swirl and considering the construction of the piston and the nozzle carrier. Alternatively, the ignitable mixture may be formed in the substantially cylindrical or spherical recess in the piston. The most appropriate state of aggregation of the fuel for the formation of the ignitable mixture depends on the state of aggregation of the fuel intended for the formation of the basic mixture. For any type of ignition mixture formation it is important that a composition of the mixture be achieved which may be ignited by a normal ignition spark. If the ignitable mixture is formed by means of a second pump and by the second nozzle 12, it is important that the two partial streams of fuel delivered by the pumps be correlated in a predetermined manner such that the proper value for the air ratio in the 'cloud' of ignitable mixture is obtained. Furthermore, the amount of residual gas flowing in the region of the nozzle carrier and the amount of gas flowing out of the recess in the piston during ignition mixture formation if the ignitable mixture is formed outside the recess in the piston must also be taken into account in determining the amount of fuel required to form the ignitable mixture.

Blow-in or injection of the second partial fuel stream for forming the ignitable mixture commences at positions of the piston located about 5 to 50 crank angle degrees before the position of the piston at ignition, depending on how the ignitable mixture is formed.

The second partial fuel stream may be delivered by a second pump, vaporized in a further chamber and fed to the nozzle 12 via an appropriate heated line (cooled if the fuel is injected in the liquid state), this line being equipped with a relief valve like the line for the first partial fuel stream.

It may also be expedient to keep the cross-section of the line between the fuel pump and the fuel vaporizing device in which the fuel exists in the liquid state, very narrow and the distance between the fuel pump and the fuel vaporizing device very short.

The most appropriate placing of the electrodes on the circumference and/or in the region of the end face of the nozzle carrier will depend upon the position of the ignitable mixture at the moment of sparking.

The spoon(s) 35 provided in the region of the recess in the piston swirl(s) the flow in the region of the recess in the piston. These spoons 35 may also be used to advantage in the embodiment of the invention in which the ignitable mixture is formed in the recess 31 in the piston. Microturbulence in the region of the recess in the piston and of the nozzle carrier facilitates the formation of the ignitable mixture, reduces the rate of flow in the region of the electrodes and mixes the residual gas flowing around the nozzle carrier with fresh gas. Discontinuous combustion and pressure fluctuatons in the cylinder are avoided.

According to a further embodiment of the invention, the fuel may be injected or blown into the helically rotating air during the intake stroke. In that case, it is advisable to provide a plurality of first nozzles because the pitch with which the air flows into the cylinder and hits the fuel jet is comparatively large. As a result, one or more helical stream(s) of mixture is (are) formed which extends (extend) toward the piston and which is (are) compressed like a helical spring during the compression stroke.

With this type of mixture formation, too, it is important that the fuel pump delivery curves be adapted to suit the fuel demand characteristics of the engine. While the air density changes significantly during mixture formation when fuel is blown in or injected and the mixture is formed during the compression stroke, fluctuations of the air density in the cylinder during the intake stroke are comparatively slight. Consequently, the amount of fuel required per crank angle degree during a single mixture forming process is also subject to comparatively slight fluctuations only.

If the mixture forming process starts during the intake stroke and ends during the compression stroke, a stream of fuel-air mixture is formed which initially extends toward the piston and then toward the cylinder head. As a result, part of the helically rotating air contacts the fuel jet twice and is twice enriched with fuel, a fact which must be taken into account in adapting the fuel delivery curves to the fuel demand characteristics of the engine.

It may be advantageous to equip the individual fuel lines in the fuel pumps with valves.

It may also be advantageous to install a shut-off valve in the fuel line downstream of the fuel vaporizing device and a further relief valve between the fuel vaporizing device and the shut-off valve in order to permit the fuel vaporizing device to be relieved between successive fuel delivery cycles.

Since only part of the total air is enriched with fuel according to the method of this invention, it may be expedient to employ pressure charging and charge air cooling to improve the specific power output of the engine. If pressure changing is employed, the fuel pump delivery curves must be adapted to the corresponding fuel demand curves.

OPERATION

The function of the engine and the advantages obtainable from practice of the invention are described below:

Helically rotating air flows from the inlet channel into the cylinder. The piston-swept and compression spaces of the cylinder are symmetrical about the cylinder axis and a free fluid flow is generated therein which shows no special peculiarities.

The primary and secondary motions of the air when the air flows from the piston-swept space into the compression space and thereby deflects the jet of fuel, carrying along fuel from the jet so that a helically flowing mixture zone is formed which is then transformed into a well defined basic mixture enclosed in a ring, or a cylinder, of pure air if the blow-in depth of the fuel jet is appropriately selected.

The engine can be governed by changing the volume of the mixture zone on the one hand (fuel-air ratio constant) and the fuel-air ratio in the mixture zone on the other hand (volume constant) or by combining those two methods. The methods described permit the amount of fuel delivered to the engine during a single mixture forming process to be distributed over a comparatively small or a comparatively large amount of air, as desired. Thus, a predetermined amount of fuel may be distributed over a predetermined amount of helically rotating air in such a manner that a mixture zone of comparatively small volume is formed with a low air ratio. Alternatively, a mixture zone of comparatively large volume and high air ratio may be formed with the same amount of fuel by changing the nozzle cross-section and/or the fuel vapor temperature and/or the differential pressures between the fuel delivery device and the air in the cylinder, thereby causing the configuration of the fuel jet, i.e. the depth to which the fuel penetrates into the helically rotating air, to be changed. Conversely, a mixture zone of large volume and low fuel-air ratio or a mixture zone of small volume and high fuel-air ratio may be formed by selecting and adjusting the fuel and air parameters accordingly.

If the parameters relating to the fuel are appropriately adjusted and adapted to suit the parameters relating to the air flow, with the amount of fuel being determined by the current momentary and/or desired load, a zone of basic mixture may be formed which meets the requirements of efficient, low-pollution combustion in terms of air ratio and volume. In order to achieve the desired objectives, it is important that the zone of basic mixture thus formed be as lean as possible.

An important advantage is the result that, when lean mixtures are burned, the maximum flame temperature becomes lowered, which brings about three essential improvements: the thermal and frictional losses decrease, the dissociation is lower and, as the gas taken in is only slightly throttled, the pumping losses are reduced. The thermal efficiency of the engine due to these improvements is greatly raised.

The reduction of the maximum flame temperatures causes a considerable drop in the amount of oxides of nitrogen in the exhaust gas. As the combustion occurs in a space in which the volume of the ignition mixture is small, no zones of a high flame temperature are created, thus the creation of nitrogen oxides is considerably reduced.

The creation of nitrogen oxides is further reduced by the expansion of the burning mixture zone during which the ring of pure air is compressed.

The manner in which the mixture is formed according to the present invention not only enables a mixture zone to be formed which is enclosed by a ring of pure air, but also enables the fuel to be substantially evenly distributed in said mixture zone, which also counteracts the formation of pollutants with respect to nitric oxides.

As there is, furthermore, an excess of air in the basic mixture and because the volume of the ignition mixture zone is so small, the arising of carbon monoxide is prevented in addition.

How the basic mixture, which is transformed into hot burning gases during combustion, acts with respect to the amount of hydrocarbons in the exhaust gas and with respect to the thermal efficiency may best be described as follows: Owing to the deflection of the jet of fuel in the direction of rotation of the air, the basic mixture is encased by a transition zone which is small in volume and which separates the basic mixture from the enveloping air. During combustion and expansion, the shape of the basic mixture (burning gases) substantially retains its rotary symmetry, because the forces which go into action (as the temperature difference is so great between the hot burning gases and the air which does not participate in the combustion, and also because the gas rotates) maintain the hot burning gases in the inner region of the piston-swept space and the compression space. The transition layer between the hot burning gases and the cold air becomes heated during the combustion and the expansion and the hydrocarbons which may be present in the transition zone will become burned.

During operation of the engine, no mixture enters into the gap between piston and cylinder, and this means that the amount of hydrocarbons in the exhaust gas is, therefore, lowered still more.

When the engine is cold, no fuel condenses on the wall of the cylinder and the cylinder head. This brings about an improvement of the quality of the exhaust gas and a decrease of the wear and tear on the engine as there is no oil washed off the cylinder wall surface. The amount of oil consumed is lowered, and the lubricating performance of the oil is not reduced because no fuel becomes mixed into it. There is no binding or seizing of the piston. To this must be added that the thermal efficiency of the engine is further raised substantially due to the lowered heat transition into the cylinder, cylinder head and piston during combustion and expansion because the air ring, or air cylinder, which surrounds the hot burning gases has an insulating effect. The insultating air ring or air cylinder reduces not only the direct heat losses (to he walls), but also the indirect heat losses (to the exhaust gas). The heat losses caused by the nozzle carrier and the recess in the piston are more than balanced by the insulating effect of the air ring or air cylinder.

The mixture zone and the burning gases expand during combustion and compress the ring or cylinder of air by which it is they are surrounded. The pressures in the cylinder and the peak temperatures of the burning gases thus remain relatively low, which reduces the formation of nitrogen oxides and increases thermal efficiency. Moreover, the compression ratio can be very high, even if fuels with regular octane numbers are used, without causing pressure-rise knock, which, in turn, has a favorable effect on thermal efficiency.

Concentrating the mixture in the inner region of the combustion space and surrounding the hot combustion gases by an envelope of air affords important thermodynamic advantages. By dispensing with intake air throttling and using pressure charging (substituting pressure for volume) approximately the same gas mass can be obtained in the mixture zone as the gas mass distributed over the entire space in a comparable conventional engine with intake air throttling but without pressure charging.

The volume and surface reduction resulting from the concentration of the mixture and combustion gases in the inner and medium regions of the combustion space in conjunction with the inclusion of the combustion gases in an envelope of air acting as an insulator substantially reduces the wall heat losses so that the thermal efficiency increases considerably.

A further advantage resulting from the concentration of the mixture in the inner region of the combustion space is the reduction in length of flame travel. The short flame travels permit even lean mixtures to be burned with sufficient speed, thereby optimizing heat release in terms of thermal efficiency.

Owing to the rapid combustion of the mixture and the existence of the air envelope surrounding the combustion gases, the system behaves thermodynamically and in terms of heat losses in a manner similar to the behavior of a system with the same amount of fuel distributed over the entire available space and the entire air and with sufficiently rapid combustion of the lean mixture.

Since the combustion of lean mixtures tends to be very slow and incomplete, only part of the air in the cylinder is mixed with fuel according to the mixture formation process of the invention which the remaining part remains free of fuel. This permits very high total air ratios (air ratio of the mixture plus air ratio of the air) to be used without adversely affecting the combustion process if, for instance, the air ratio in the mixture zone is 1.5 while the gas in the mixture zone accounts for one-third and the air in the surrounding envelope for two-thirds of the total gas mass in the cylinder.

All these features contribute towards reducing the specific fuel consumption of the engine. Furthermore, the engine may be operated with a very high air ratio, which has the effect that consumption is considerably reduced.

The engine may be operated with gasoline, light hydrocarbons and/or their mixtures, gasoline-methanol mixtures, methanol, methanol-water mixtures, ethanol, ethanol-water mixtures, liquified petroleum gas and all gaseous fuels, i.e. fuels which need not be vaporized. If gaseous fuels are used, the fuel vaporizing device is replaced by means which deliver the gaseous fuel in accordance with the operating parameters of the engine.

What is claimed is:

1. A method of forming a combustible and rotating fuel-air mixture surrounded by a ring of air in a four-stroke internal combustion engine with cylinder, cylinder head, piston, gas inlet means, gas outlet means, ignition means and combustion space, characterized in that air with a substantially helically rotating flow pattern is introduced into the cylinder via inlet means disposed substantially coaxially with the longitudinal axis of the cylinder, that substantially turbulence-free and helically rotating gas is then compressed, that vaporized or gaseous fuel is blown into the helically rotating air by means of a fuel delivery device, fuel conducting means and at least one nozzle connected to said fuel conducting means and disposed in the region of the longitudinal axis of the cylinder in spaced relation to said inlet means, the amount of fuel being metered, the depth to which the fuel jet penetrates into the helically rotating air, the length of time measured in crank angle degrees during which the said fuel is blown in, the number of nozzle holes, the diameters of the nozzle holes, the shape of the nozzle holes, and the orientation of the nozzle holes being selected such that a combustible, rotating and substantially circular mixture zone enveloped in air is obtained.

2. A method of claimed in claim 1, characterized in that the fuel is blown into the helically rotating air substantially during the compression stroke.

3. A method of forming a combustible and rotating fuel-air mixture surrounded by a ring of air in a four-stroke internal combustion engine with cylinder, cylinder head, piston, gas inlet means, gas outlet means, ignition means and combustion space, characterized in that air with a substantially helically rotating flow pattern is introduced into the cylinder via inlet means disposed substantially coaxially with the longitudinal axis of the cylinder, that substantially turbulence-free and helically rotating gas is then compressed, that liquid fuel is injected into the helically rotating air by means of a fuel delivery device, fuel conducting means and at least one nozzle connected to said fuel conducting means and disposed in the region of the longitudinal axis of the cylinder in spaced relation to said inlet means, the amount of fuel being metered, the depth to which the fuel jet penetrates into the helically rotating air, the length of time measured in crank angle degrees during which the said fuel is injected, the number of nozzle holes, the diameters of the nozzle holes, the shape of the nozzle holes, and the orientation of the nozzle holes being selected such that a combustible, rotating and substantially circular mixture zone enveloped in air is obtained.

4. A method as claimed in claim 3, characterized in that the fuel is injected into the helically rotating air substantially during the compression stroke.

* * * * *